United States Patent Office 3,565,965
Patented Feb. 23, 1971

3,565,965
PROCESS FOR THE SEPARATION OF AROMATIC ISOMERS
David G. Walker, Baytown, Tex., and Robert B. Long, Atlantic Highlands, N.J.; said Long assignor to Esso Research and Engineering Company, a corporation of Delaware
Continuation-in-part of application Ser. No. 541,244, Apr. 8, 1966. This application Nov. 26, 1968, Ser. No. 805,919
Int. Cl. C07c 7/10
U.S. Cl. 260—674
15 Claims

ABSTRACT OF THE DISCLOSURE

A solvent extraction process for separating components of a feedstream comprising isomeric $C_8$–$C_{20}$ alkyl benzene and naphthalene or mixtures thereof in which the feedstream is contacted with a ternary compound, said ternary compound comprising $R:HX:2AlX_3$ wherein R is selected from the group consisting of $C_8$–$C_{20}$ alkyl benzenes and naphthalenes and is at least as basic as the material to be separated, and X is selected from the group consisting of chlorine and bromine, in the presence of a hydrogen halide.

FIELD OF THE INVENTION

Figure 1:
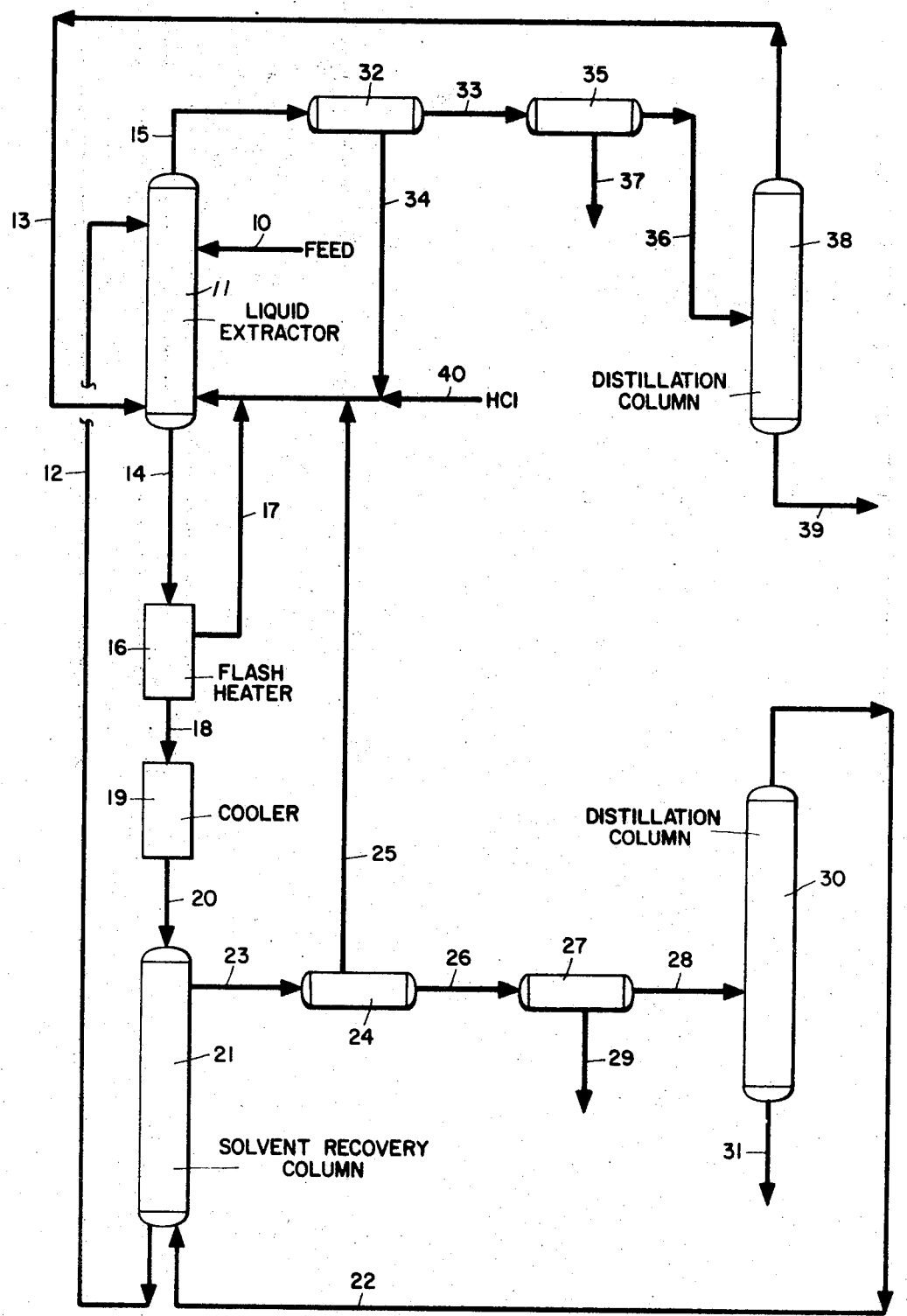

This invention is a continuation-in-part of Ser. No. 541,244, filed Apr. 8, 1966, and now abandoned. This invention relates to the separation of aromatic isomers and mixtures thereof. More particularly, this invention relates to a liquid extraction process wherby aromatic isomer may be separated by selective protonation. In a preferred embodiment, this invention relates to a liquid extraction process for separating m-xylene from its isomers, utilizing an extract solvent comprising a ternary compound having the general formula:

$$R:HX:2AlX_3$$

wherein R is a mono- or polynuclear aromatic compound and X is chlorine or bromine, the extraction being effected in the presence of a hydrogen halide, i.e., hydrogen chloride or hydrogen bromide. In a particularly preferred embodiment of this invention, the extract solvent is mixed with benzene to increase the degree of separation attainable; and, more preferably, the extraction is carried out in a staged liquid-liquid extraction column wherein a simultaneous countercurrent benzene wash is utilized to enhance the efficiency of the extraction process.

The process of this invention finds particular advantage in the separation of m-xylene from its $C_8$ isomers, although similar separations may be effected of $C_8$–$C_{20}$ isomers and mixtures thereof. In regard to the xylenes, however, m-xylene is usually a major component of $C_8$ aromatic isomer streams, e.g. about 20–80%. The individual isomers are widely utilized as chemical and fiber intermediates, with p-xylene finding the most extensive use. The recovery of p-xylene, by fractional crystallization, is complicated by the presence of m-xylene in the stream. p-Xylene and m-xylene form a eutectic mixture which limits p-xylene yields to about 50%. Similarly, ethyl benzene and o-xylene can be recovered in yields of only about 50–75% and 50%, respectively. It has now been discovered that by utilizing the present invention m-xylene may be separated from its isomers in yield and purity exceeding 90%. Consequently, the present invention allows for the subsequent recovery of each of the xylene isomers in yields also exceeding 90%, e.g., p-xylene fractional crystallization may be conducted at higher temperatures. Furthermore, m-xylene can now be made available in large quantities and high degrees of purity, thus providing another valuable chemical intermediate where previously the m-xylene was usually burned for fuel value.

SUMMARY OF THE INVENTION

In accordance with this invention, therefore, isomeric mixtures of $C_8$–$C_{20}$ alkyl substituted benzenes, dialkyl substituted naphthalenes and mixtures thereof may be separated by liquid extraction with an extract solvent comprised of a ternary compound having the general formula: $R:HX:2AlX_3$, wherein R is an aromatic hydrocarbon at least as basic as the material to be extracted and X is chlorine or bromine, the extraction being carried out in the presence of a hydrogen halide, i.e., hydrogen chloride or hydrogen bromide.

The use of similar solvents for extraction processes has been known to the prior art. However, conducting the extraction in the presence of hydrogen halide to afford protonation of the most basic compound in the feed has remained undiscovered until the present invention.

The process of this invention utilizes the fact that aromatic compounds possess different degrees of basicity and that it is possible to preferentially pretonate the most basic compound contained in a mixture of that compound and other compounds. The basicity of a compound is herein used to designate the tendency of that compound to accept a proton, i.e. the greater the basicity, the greater the tendency to accept a proton and become protonated. A review of the relative basicities of methyl benzenes and the method used for determining basicity is presented in Ehrenson, J. Am. Chem. Soc. 84, 2681–2687 (1962). Consequently, the most basic compound in a mixture can be preferentially protonated and recovered. For example, in a $C_8$ aromatic stream m-xylene is preferably protonated because it has a significantly greater basicity than any of the other $C_8$ isomers. The process is conducted by utilizing an extract solvent that can exist as an ionic solvent, e.g.:

$$R:HX:2AlX_3 \rightleftharpoons (R-H)^+ + (Al_2X_7)^- \quad (1)$$

protonating the material to be extracted, m-xylene + $(R-H)^+(Al_2X_7)^-$ + HX →
$(R-H)^+ + 2(AlX_4)^- +$ (m-xylene)
(2)

wherein HX is utilized to protonate the m-xylene, the rotonated m-xylene preferentially dissolving in the ionic extract solvent. Since the remaining compounds in the feed mixture do not undergo protonation, a two-phase product, i.e. ionic and covalent, will form; the concentration of the protonated m-xylene being greater in the ionic phase relative to the covalent phase. The ionic phase may then be recovered as an extract phase and the m-xylene recovered therefrom by several different methods, e.g. vacuum distillation or preferably by extraction with benzene, which also serves to regenerate the solvent according to the following equation:

$(R-H)^+ + 2(AlX_4)^- +$ (m-xylene-H)$^+$ + benzene →
$(R-H)^+ + (2AlX_7)^- + HX +$ (benzene + m-xylene) (3)

the m-xylene subsequently being recovered by distillation of the benzene extract phase.

By utilizing the process of this invention, many different separations may be effected. Generally, feedstreams containing isomeric alkyl substituted benzenes, dialkyl substituted naphthalenes, and mixtures thereof in the $C_8$–$C_{20}$ range may be separated. The isomer to be separated, or compound if mixtures are present, will be that one whose basicity is greatest, relative to the remainder of the feed. Preferred feedstreams are the isomeric $C_8$–$C_{12}$ alkyl substituted benzenes and mixtures thereof, preferably $C_8$–$C_{10}$ alkyl substituted benzenes and mixtures thereof, and more preferably the $C_8$–$C_9$ isomeric dialkyl substituted benzenes and mixtures thereof. Examples of feedstreams and the compound which will be extracted are m-xylene from $C_8$ isomers, mesitylene from $C_9$ isomers, isodurene from $C_{10}$ isomers, hexamethyl benzene from a mixture containing methyl benzenes, and the like. Similarly, in $C_8$ and $C_9$ streams, etc., the most basic compound will be protonated and extracted.

The extract solvents applicable to this invention may be broadly characterized as comprising a ternary liquid addition compound having the general formula:

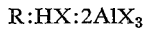

wherein X is chlorine or bromine; and, R is normally liquid alkyl substituted aromatic of the benzene or naphthalene series and is at least as basic as the material to be extracted. Preferably, R is an alkyl substituted benzene or alkyl substituted naphthalene in the $C_8$–$C_{20}$ range. More preferably, R is a $C_8$–$C_{12}$ alkyl benzene, still more preferably $C_9$–$C_{12}$ alkyl benzene. The choice of R will depend upon the material to be separated, since R must be at least as basic as that material, and preferably is more basic.

Illustrative of the aromatic compounds that may be employed and listed in order of increasing basicity are: m-xylene, pseudocumene (1,2,4-trimethyl benzene), hemimellitene (1,2,3-trimethyl benzene), durene (1,2,4,5-tetramethyl benzene), mesitylene (1,3,5-trimethyl benzene), prehnitene (1,2,3,4-tetramethyl benzene), isodurene (1,2,3,5-tetramethyl benzene), pentamethyl benzene, and hexamethyl benzene. Other compounds which also may be used are: isopropyl benzene, 1,3,5-dimethyl ethyl benzene, the ethyl toluenes, methyl naphthalene, dimethyl naphthalene, and the like. In the extraction of m-xylene, for example, from a $C_8$ isomer stream, although R may be m-xylene, it is preferable that R be more basic than m-xylene, and at least as basic as pseudocumene (1,2,4-trimethyl benzene), e.g. mesitylene, isodurene, hexamethyl benzene, etc.

A particularly preferred extract solvent, regardless of the aromatic compound utilized to form the ternary addition compound, is one comprising benzene and the ternary compound, more preferably a benzene saturated ternary compound is employed as the extract solvent. This preferred extract solvent may be prepared by mixing benzene with the ternary compound until a second phase begins to appear. The appearance of a second phase indicates that the ternary compound is saturated with benzene. Normally, however, the molar ratio of benzene to ternary compound is at least 7/1, and preferably 8/1 to 10/1. Benzene is used since the other aromatic compounds tend to promote side reactions which inhibit the separation to be made.

The ternary addition compounds applicable to the process of this invention may be prepared by mixing the aromatic compound with a stoichiometric excess of aluminum halide under dry nitrogen. Hydrogen halide gas is then bubbled through the mixture. The liquid product will be the pure ternary compound saturated with dissolved hydrogen halide and aluminum halide (at saturation these compounds are present in small quantities). An alternative method for preparing a more basic compound is to start with a compound such as pesudocumene, from the ternary addition compound as described, and heat the ternary compound at about 50–60° C. At these temperatures the pseudocumene will quantitatively isomerize to mesitylene with only minor amounts of side reactions. The ternary addition compounds exhibit a high degree of stability at 25° C. in nitrogen atmospheres and may be stored for long periods under these conditions. Water will hydrolyze the ternary addition compounds, reacting vigorously to yield a two-phase product: an organic phase comprising the aromatic compound; and, an aqueous phase comprising the hydrated aluminum halide and hydrogen halide.

The ternary addition compound will form in the ratio of 1:1:2 relative to $R:HX:2AlX_3$. However, the ternary compound is capable of dissolving excess R to an extent such that the molar ratio of R to the ternary compound in the extract solvent may range from 1:1 to 3:1, preferably 2.5:1 to 1.5:1, and more preferably 2.1:1 to 1.9:1.

It is essential that the extraction process be carried out in the presence of a hydrogen halide extraneous to the ternary compound. In general, the hydrogen halide will be present in a molar ratio of about 0.2:1 to 5.0:1 relative to the material to be extracted; preferably 0.75:1 to 2:1, and more preferably 1:1 to 1.1:1. It is still more preferable, under the foregoing molar relationships, to utilize the hydrogen halide such that a hydrogen halide gas pressure of about 0.2–10 atm., preferably 1–10 atm., is produced.

Under normal operating conditions increasing hydrogen halide gas pressures in the extraction zone will serve to increase the rate and degree of protonation of the most basic component in the feed, and, therefore, will increase the efficiency of the extraction process.

The molar ratio of the ternary compound in the extract solvent to the material to be extracted, e.g. m-xylene in a $C_8$ aromatic stream, should be about 0.3:1 to 3.0:1, preferably 1:1 to 1.6:1, whether or not the ternary compound is mixed with benzene. Temperatures in the extraction zone are not critical so long as the ternary compound remains in the liquid phase. Normally, temperatures will range from about −20° C. to +50° C., preferably −10° C. to +30° C.

In a particularly preferred embodiment, a staged liquid-liquid extraction column employing a simultaneous countercurrent benzene or benzene-toluene wash stream, is used to markedly decrease the number of extraction stages required to produce a high purity product. The benzene or benzene-toluene wash stream is normally fed to the column at a molar ratio of about 3/1 to 12/1 based on total feed, preferably 3/1 to 8/1. However, ratios outside this range may also be used satisfactorily. The benzene-toluene mixture, which is preferred to the use of benzene alone will also be present in the same molar ratios. Within the mixture, benzene is present in the amount of 50 to 99 mole percent based on the total mixture. The remainder of the mixture is, of course, toluene. The presence of the toluene serves to inhibit the freezing of benzene at lower temperatures, i.e. the freezing point of benzene which is 5.5° C. Benzene may be used independently of toluene, in those instances where the process will be carried out at temperatures in excess of the freezing point of benzene. Conversely, in those instances where the process is carried out below the freezing point of benzene, a mixture of benzene and toluene is to be utilized.

Figure 2:
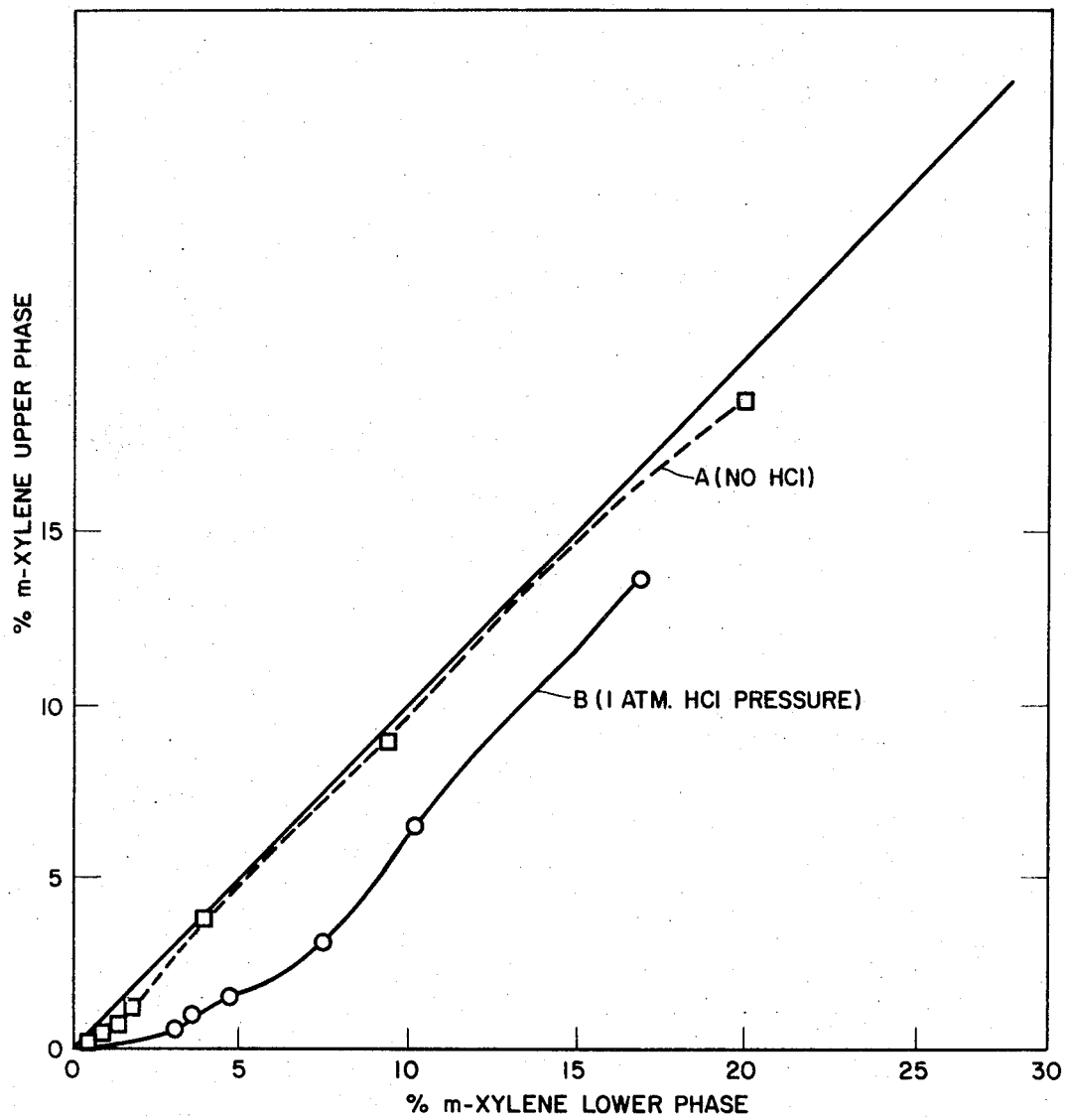
Figure 3:
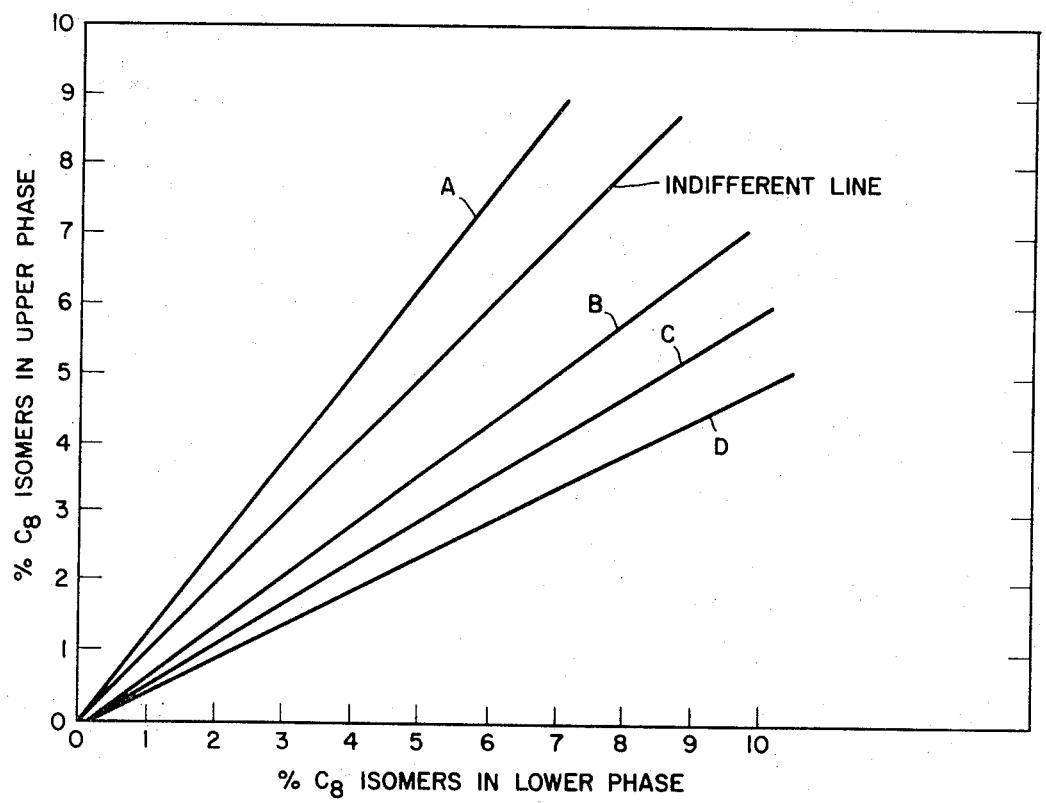

This invention will be more readily appreciated by reference to FIG. 1, attached hereto, which schematically illustrates an m-xylene extraction process. FIGS. 2 and 3 illustrate the effect of hydrogen halide gas pressures on the extractive process and the effect of a benzene wash stream, respectively.

Turning now to FIG. 1, a $C_8$ aromatic isomer stream comprising m-xylene, o-xylene, p-xylene, and ethyl benzene in a molar ratio of about 2:1:1:1, is introduced to liquid extraction zone 11 in line 10. Benzene-toluene wash saturated extract solvent is introduced at the top of zone 11 by line 12, and a benzene-toluene wash stream is introduced at the bottom of zone 11 by line 13. The gas pressure is maintained by introducing HCl through line 40. The extract solvent has a greater density than the aromatics present (both $C_6$ and $C_8$) and will descend through the extraction zone, dissolving the preferentially protonated m-xylene, while the aromatics, i.e. benzene-toluene wash and $C_8$ isomers, rise; the benzene-toluene washing dissolved $C_8$ isomers out of the ionic phase. An extract phase comprising benzene-toluene wash saturated extract solvent and m-xylene is withdrawn by line 14 and a raffinate phase comprising benzene and $C_8$ isomers is withdrawn by line 15. The extract phase is passed to flash heater 16 operating at about 40–100° C. and 0.01–0.5 atm., where excess HCl is flashed off and recycled by line 17. The extract phase then passes via line 18 to cooler 19 and by line 20 to solvent recovery column 21. Solvent recovery may be carried out in a simple extraction zone or, as illustrated, in a staged liquid extraction zone. Solvent recovery column 21 may be operated at temperatures of about 0–60° C., preferably 5–25° C., and at atmospheric pressure. The extract phase from extraction zone 11 is contacted with the benzene-toluene mixture from line 22, which extracts the m-xylene from the ionic solvent (since no HCl pressures are maintained, the m-xylene can be deprotonated and extracted by benzene-toluene mixture). The extract solvent is withdrawn by line 12 and recycled for use in extraction zone 11. The benzene-toluene-m-xylene mixture is withdrawn by line 23 and passed to flash heater 24 where traces of HCl are completely removed and recycled by line 25. The mixture is then passed to water scrubber 27 by line 26 where residual extract solvent is hydrolyzed and removed by line 29. The mixture is then passed to distillation column 30 by line 28 where m-xylene is recovered in substantially pure form in line 31; the benzene-toluene overhead in line 22 is then recycled to solvent recovery column 21 for further use.

The remaining $C_8$ isomers, i.e. o-xylene, p-xylene, and ethyl benzene, which leave extraction zone 11 with the benzene-toluene wash in line 15 are passed to flash heater 32 for HCl removal (the HCl recycled by line 34), and then by line 33 to water scrubber 35, where residual extract solvent is hydrolyzed and removed by line 37, and then by line 36 to distillation column 38, where the $C_8$ isomers are recovered in line 39 for further purification and separation; the benzene-toluene overhead in line 13 being recycled to extraction zone 11 as a wash stream.

In a variation of this process (not shown), flash heater 16 and solvent recovery column 21 may be combined and operated at a temperature of about 40–70° C. and under a partial vacuum of about 0.1–0.5 atm. in order to boil the benzene in the column and simultaneously sweep out HCl for recycle.

EXAMPLE 1

An example of the cyclic process illustrated herein is shown below in tabular form. Each table shows the complete material balance for the equipment involved in the process with reference characters referred to FIG. 1. The extract solvent is comprised of benzene saturated mesitylene:HCl:2AlCl$_3$ ternary compound. Enough HCl is supplied sufficient to produce an HCl gas pressure driving force of 1 atm. in the extraction zone. The temperature of the extraction zone is 0° C.

EXTRACTION COLUMN, 11

| Stream | In | Out |
|---|---|---|
| Feed, 10 | 40 pts. m-xylene<br>60 pts. $C_8$ isomers | |
| Solvent, 12 | 50 pts. solvent<br>240 pts. benzene<br>60 pts. toluene<br>5 pts. m-xylene | |
| Benzene-toluene wash, 13 | 400 pts. benzene<br>100 pts. toluene<br>0.5 pt. $C_8$ isomers | |
| Extract phase, 14 | | 50 pts. solvent<br>240 pts. benzene<br>60 pts. toluene<br>36.2 pts. m-xylene<br>1.0 pt. $C_8$ isomers |
| Raffinate phase, 15 | | 400 pts. benzene<br>100 pts. toluene<br>59 pts. $C_8$ isomers<br>8.8 pts. m-xylene |

SOLVENT REGENERATION COLUMN, 21

| Stream | In | Out |
|---|---|---|
| Extract phase, 20 | 500 pts. solvent<br>240 pts. benzene<br>60 pts. toluene<br>36.2 pts. m-xylene<br>1.0 pt. $C_8$ isomers | |
| Benzene extract solvent, 22 | 320 pts. benzene<br>80 pts. toluene<br>1 pt. m-xylene | |
| Solvent, 12 | | 240 pts. benzene<br>60 pts. toluene<br>50 pts. solvent<br>5 pts. m-xylene |
| Benzene-toluene-m-xylene mixture, 23 | | 320 pts. benzene<br>80 pts. toluene<br>32.2 pts. m-xylene<br>1.0 pt. $C_8$ isomers |

DISTILLATION TOWER, 30

| Stream | In | Out |
|---|---|---|
| Feed, 28 | 320 pts. benzene<br>80 pts. toluene<br>32.2 pts. m-xylene<br>1.0 pt. $C_8$ isomers | |
| Overhead, 22 | | 320 pts. benzene<br>80 pts. toluene<br>1.0 pt. m-xylene |
| Bottoms, 31 | | 31.2 pts. m-xylene<br>1.0 pt. $C_8$ isomers<br>0.1 pt. benzene<br>0.1 pt. toluene |

DISTILLATION TOWER, 38

| Stream | In | Out |
|---|---|---|
| Feed, 36 | 400 pts. benzene<br>100 pts. toluene<br>59 pts. $C_8$ isomers<br>8.8 pts. m-xylene | |
| Overhead, 13 | | 400 pts. benzene<br>100 pts. toluene<br>0.5 pt. $C_8$ isomers |
| Bottoms, 39 | | 59 pts. $C_8$ isomers<br>8.8 pts. m-xylene<br>0.1 pt. benzene<br>0.3 pt. toluene |

Thus, it is quite clear that although stream contaminations may occur to a minor extent, the purity of m-xylene recovered from line 23 will be quite high, e.g. >95%.

The following additional examples will further serve to illustrate the process of this invention. However, no limitations other than those incorporated in the appended claims are to be implied.

EXAMPLE 2

Effect of hydrogen halide gas pressure on m-xylene separation

FIG. 2 graphically depicts the effect of HCl gas pressure on the distribution of m-xylene between the two phases formed when a mixture of mesitylene:HCl2AlCl$_3$, benzene, and m-xylene is allowed to reach equilibrium. Several experiments were conducted wherein 5 ml. of mesitylene:HCl:2AlCl$_3$ extract solvent were vacuumed to remove all traces of HCl and then mixed with a benzene/m-xylene mixture. The experiments were carried out with and without the presence of excess HCl sufficient to produce HCl gas pressure. It is clearly evident that the separation of m-xylene between the two phases in the absence of HCl gas pressure does not allow for a practicable separation. However, the presence of excess HCl sufficient to produce 1 atm. HCl gas pressure shows a definite distribution ratio of m-xylene between the phases. Further increasing the HCl gas pressure would serve to decrease the slope of curve B and increase the degree of separation of m-xylene between the phases. All points were determined at 25° C. and on a solvent-free basis. When equilibrium was reached the lower phase was successively washed with 10 ml. aliquot portions of benzene. Aliquots of the upper and lower phases were quantitatively analyzed by GPC after hydrolysis of the lower phase.

EXAMPLE 3

Effect of absence of benzene in extract solvent

An extract solvent of mesitylene:HCl:2AlCl$_3$ was contacted with various synthetic mixtures of C$_8$ aromatics containing 5, 25, 42, 55, and 93% m-xylene, the balance being equal parts of p-xylene, o-xylene, and ethyl benzene. Equilibrium was established at 0° C. and 1 atom. HCl gas pressure. The m-xylene separation between upper and lower phases is shown in Table I for each of the five runs. Analyses were made as in Example 2.

TABLE I

| Run No.: | Percent m-xylene in C$_8$'s upper phase | Percent m-xylene in C$_8$'s lower phase | β[1] |
|---|---|---|---|
| 1 | 4.7 | 6.4 | 1.37 |
| 2 | 22.3 | 27.3 | 1.31 |
| 3 | 41.6 | 44.8 | 1.21 |
| 4 | 52.7 | 59.6 | 1.33 |
| 5 | 92.6 | 94.2 | 1.35 |

[1] $\beta = \dfrac{(\text{percent m=xylene lower phase})}{(\text{percent m=xylene upper phase})} \div \dfrac{(\text{percent C}_8 \text{ upper phase})}{(\text{percent C}_8 \text{ lower phase})}$ A higher β factor indicates greater separation between the m-xylene and the other C$_8$ isomers.

EXAMPLE 4

Effect of presence of benzene in extract solvent

Experiments were conducted similar to those of Example 3 except that the mesitylene:HCl:2AlCl$_3$ extract solvent was saturated with 10 ml. of benzene. Table II shows the m-xylene separation between upper and lower phases for each run.

TABLE II

| Run No. | Percent m-xylene in C$_8$'s upper phase | Percent m-xylene in C$_8$'s lower phase | β | Percent increase[1] in β |
|---|---|---|---|---|
| 1 | 3.6 | 24.5 | 8.5 | 520 |
| 2 | 14.7 | 39.3 | 3.8 | 190 |
| 3 | 33.0 | 70.0 | 4.7 | 290 |
| 4 | 54.2 | 84.2 | 4.5 | 250 |
| 5 | 67.1 | 92.0 | 5.6 | 300 |

[1] As compared to β in Example 3.

Comparison of the results in Examples 3 and 4 indicates that a benzene saturated extract solvent greatly increases the relative concentration of m-xylene in the lower phase over that in the upper phase. This is indicated by the large increase in β factors shown in Example 4 over those of Example 3.

EXAMPLE 5

Effect of benzene wash stream in liquid extraction column

FIG. 3 graphically depicts the effect of utilizing a countercurrent benzene wash stream in the liquid extraction zone. The phase relationship shown were determined 0° C. and 1 atmosphere HCl gas pressure. Equilibrium was established and the phase distributions analyzed as in Example 2. The results are plotted on an extract solvent-free basis (mesitylene:HCl:2AlCl$_3$ was the extract solvent and was saturated with benzene). The indifferent line represents an equal distribution of C$_8$ isomers, i.e. o-xylene, p-xylene, ethyl benzene, between the phases. Line A, however, represents the actual phase distribution of these three isomers. Lines B, C, and D represent the phase distribution as each stage is washed wtih benzene in molar ratios of approximately 4/1, 5/1, and 6/1, respectively, based on total moles of C$_8$ aromatics in the column. It will be noted that the slope of lines B, C, D, representing the C$_8$ isomer phase distribution, falls off sharply with increasing benzene wash ratios. Conversely, the slope would increase with decreasing benzene wash ratios. The obvious conclusion being that the number of theoretical extraction stages required for a desired separation will decrease with increasing benzene wash ratios. For example, if a C$_8$ isomer concentration of 0.33% is desired in the extract phase, stepping off the extraction stages on FIG. 3, with respect to the indifferent line (which is a better condition than the actual isomer distribution) results in 8, 5, and 4 stages for lines B, C, and D, respectively.

EXAMPLE 6

Recovery of m-xylene from extract phase

Two experiments were conducted to determine the feasibility of recovering m-xylene from an extract phase. These experiments represent the recovery of substantially pure m-xylene from a phase comprising 50 pts. (mesitylene H)$^+$ (Al$_2$Cl$_7$)$^-$ +40 pts. HCl+50 pts m-xylene +300 pts. benzene.

(A) Regeneration at 50° C., atmospheric pressure with a nitrogen gas purge 5.0 ml. (MesH)$^+$(Al$_2$Cl$_7$)$^-$, 2.0 ml. (1.72 g.) m-xylene and 10.0 ml. benzene were combined at 0° C. and bubbled with 1 atm. HCl to equilibrium.

The sample was then heated to 50° C. with a nitrogen purge bubbling through and extracted rapidly with 6 20-ml. washes of benzene. The upper phases were removed and analyzed for m-xylene. The residual phase upon hydrolysis contained 80.5% benzene, 19.5% mesitylene, with an undetectable amount of C$_8$ aromatic. Extracts 6, 5, 4, and 3 contained 0.00, 0.03, 0.16, and 0.10 g. of m-xylene, respectively. The first extract contained m-xylene of better than 99% purity (on C$_8$ aromatics). This shows that no isomerization of the m-xylene occurred.

(B) Vacuum distillation 0.00603 g. mol (mesitylene H)$^+$(Al$_2$Cl$_7$)$^-$, 0.00407 g. mol m-xylene, and 0.0497 g. mol of benzene were combined and stirred with exactly 255 std. ml. of gaseous HCl (0.0105 g. mol) at 0° C. until equilibrium. The sample was then allowed to boil under high vacuum at 25° C. for exactly 4 minutes using a Dry Ice trap and a liquid nitrogen trap. The liquid nitrogen trap contained 290 std. ml. of gas (HCl plus some benzene), the Dry Ice trap contained 4.2 g. of a mixture, 92.7% benzene, 6.3% m-xylene, and 0.2% of some C$_9$ aromatic (GPC estimates). The residual (mesitylene H)$^+$(Al$_2$Cl$_7$)$^-$ phase was hydrolyzed and the resulting organic phase analyzed. It was 0.27% benzene, 1.06% m-xylene, 98.5% mesitylene, and 0.04% C$_9$ aromatic. Less than 3% of the m-xylene charged was found still to be in the lower phase.

What is claimed is:

1. A process for the separation of a feedstock selected from the group consisting of isomeric C$_8$-C$_{20}$ alkyl benzenes, naphthalenes, and mixtures thereof which comprises contacting said feedstock, in a liquid extraction zone in the presence of a hydrogen halide, with a liquid extract solvent which comprises a benzene and a ternary compound having the general formula:

$$R:HX:2AlX_3$$

wherein R is selected from the group consisting of C$_8$-C$_{20}$ alkyl benzenes and alkyl naphthalenes and is at least as basic as the material to be separated, and X is selected from the group consisting of chlorine and bromine.

2. The process of claim 1 wherein the molar ratio of benzene to ternary compound is at least 7:1.

3. The process of claim 1 wherein the extraction zone is maintained at a temperature of −20° C. to +50° C.

4. The process of claim 1 wherein the feedstock is a C$_8$ isomeric stream and R is at least as basic as pseudocumene.

5. The process of claim 1 wherein the feedstock is selected from the group consisting of isomeric C$_8$-C$_{12}$ alkyl benzenes and mixtures thereof.

6. The process of claim 1 wherein the said hydrogen halide is present in an amount sufficient to maintain a hydrogen halide gas pressure of about 0.2 through 10 atmospheres in the liquid extraction zone.

7. A process for the separation of a feedstock selected from the group consisting of isomeric $C_8$–$C_{20}$ alkyl benzenes and dialkyl naphthalenes and mixtures thereof which comprises introducing the feed to a liquid-liquid extraction zone; adding at a first end of the extraction zone an extract solvent comprised of benzene and a ternary liquid compound having the general formula:

$$R:HX:2AlX_3$$

wherein R is selected from the group consisting of $C_8$–$C_{20}$ alkyl benzenes and alkyl naphthalenes and is at least as basic as the material to be separated, X is selected from the group consisting of chlorine and bromine; adding benzene at a second end of the extraction zone; maintaining the extraction zone at a temperature of about $-20°$ C. to $+50°$ C., and in the presence of about 0.5 to 5.0 moles of a hydrogen halide relative to the material to be separated; withdrawing an extract phase rich in the material to be separated from the second end of the extraction zone; and withdrawing a raffinate phase rich in the remaining feedstock from the first end of the extraction zone.

8. The process of claim 1 wherein a benzene-toluene mixture is added to a second end of the extraction zone.

9. The process of claim 8 wherein the molar ratio of benzene, added at the second end of the extraction zone, to the feedstock is about 3:1 to 12:1.

10. The process of claim 8 wherein the extract solvent is comprised of benzene and the ternary compound in a molar ratio of at least 7:1.

11. The process of claim 8 wherein the feedstock is a $C_8$ isomer stream, m-xylene is the material to be separated, and R is at least as basic as pseudocumene.

12. The process of claim 8 wherein the m-xylene is recovered from the extract phase by contacting the extract phase with benzene in an extraction zone, recovering a benzene extract phase rich in m-xylene, and recovering m-xylene by distillation of the benzene extract phase.

13. The process of claim 8 wherein the ternary compound is employed in a molar ratio of about 0.3:1 to 3.0:1 relative to the material to be extracted.

14. The process of claim 8 wherein the feedstock is selected from the group consisting of isomeric $C_8$–$C_{12}$ alkyl benzenes and mixtures thereof.

15. The process of claim 8 wherein R is a $C_8$–$C_{12}$ allyl benzene.

References Cited
UNITED STATES PATENTS
2,842,604  7/1958  Waals et al. _____ 260—674

DELBERT E. GANTZ, Primary Examiner

C. E. SPRESSER, Jr., Assistant Examiner